US010443496B2

(12) United States Patent
Herrera et al.

(10) Patent No.: US 10,443,496 B2
(45) Date of Patent: Oct. 15, 2019

(54) ACOUSTIC PANELING

(71) Applicant: The Boeing Company, Chicago, IL (US)

(72) Inventors: Eric Herrera, Mukilteo, WA (US); Marta Baginska Elleby, Charleston, SC (US); Garry Duschl, Seattle, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 15/212,454

(22) Filed: Jul. 18, 2016

(65) Prior Publication Data

US 2018/0016981 A1  Jan. 18, 2018

(51) Int. Cl.
 *F02C 7/045* (2006.01)
 *F02C 7/24* (2006.01)
 (Continued)

(52) U.S. Cl.
 CPC .............. *F02C 7/045* (2013.01); *B29C 70/88* (2013.01); *B29D 24/005* (2013.01);
 (Continued)

(58) Field of Classification Search
 CPC .. G10K 11/002; G10K 11/168; G10K 11/172; B32B 37/146; F02C 7/045; F02C 7/24
 See application file for complete search history.

(56) References Cited

U.S. PATENT DOCUMENTS 5,217,556 A * 6/1993 Fell .................... B29C 65/10
                                                156/205
5,421,935 A * 6/1995 Dixon .................. B29C 65/18
                                                156/197
(Continued)

FOREIGN PATENT DOCUMENTS

GB      2252076 A     11/1994
WO   2014032443 A1    3/2014

OTHER PUBLICATIONS

Econcore Is the World Leader in New Technologies for Economic Sandwich Material Production; http://www.econcore.com/en, Jun. 20, 2016.

(Continued)

*Primary Examiner* — Edgardo San Martin
(74) *Attorney, Agent, or Firm* — Duft & Bornsen, PC (57) ABSTRACT

Systems and methods are provided for acoustic paneling. One embodiment is a method for fabricating an acoustic panel. The method includes receiving a sheet of thermoplastic paper, stamping/conforming the sheet into rows that each comprise a three dimensional shape, and transforming the sheet into a multi-celled core. Transforming the sheet includes identifying fold lines separating the rows, folding the sheet at the fold lines in a pleat fold, thereby uniting upper surfaces of adjacent rows and uniting lower surfaces of adjacent rows; and compressing the rows of the folded sheet together in the presence of heat, causing adjacent rows to fuse together into cells. The method further includes applying a backing sheet to the core, and applying a (Continued)

facesheet to a surface of the core that includes openings which direct a portion of airflow across the facesheet into the cells, resulting in acoustic control.

10 Claims, 13 Drawing Sheets (51) Int. Cl.
$G10K\ 11/172$ (2006.01)
$B64D\ 33/02$ (2006.01)
$B32B\ 27/06$ (2006.01)
$B29D\ 24/00$ (2006.01)
$B32B\ 37/14$ (2006.01)
$B29C\ 70/88$ (2006.01)
$B29D\ 99/00$ (2010.01)
$G10K\ 11/16$ (2006.01)

(52) U.S. Cl.
CPC ..... *B29D 99/0021* (2013.01); *B29D 99/0089* (2013.01); *B32B 27/06* (2013.01); *B32B 37/146* (2013.01); *B64D 33/02* (2013.01); *G10K 11/172* (2013.01); *B32B 2307/102* (2013.01); *B32B 2309/70* (2013.01); *B32B 2371/00* (2013.01); *B32B 2398/20* (2013.01); *B32B 2605/18* (2013.01); *B64D 2033/0206* (2013.01); *B64D 2033/0286* (2013.01); *F05D 2230/00* (2013.01); *F05D 2260/963* (2013.01)

(56) References Cited

U.S. PATENT DOCUMENTS

| | | | | |
|---|---|---|---|---|
| 5,543,198 | A * | 8/1996 | Wilson | B32B 3/12 428/116 |
| 5,785,919 | A | 7/1998 | Wilson | |
| 6,371,242 | B1 * | 4/2002 | Wilson | B32B 3/12 181/210 |
| 6,609,592 | B2 * | 8/2003 | Wilson | B32B 3/20 181/292 |
| 6,726,974 | B1 | 4/2004 | Pflug et al. | |
| 6,827,180 | B2 * | 12/2004 | Wilson | B32B 3/20 181/292 |
| 6,840,349 | B2 * | 1/2005 | Andre | G10K 11/172 181/290 |
| 7,484,592 | B2 * | 2/2009 | Porte | G10K 11/168 181/290 |
| 7,921,966 | B2 * | 4/2011 | Chiou | G10K 11/168 181/214 |
| 7,946,385 | B2 * | 5/2011 | Lalane | F02C 7/045 181/290 |
| 8,397,865 | B2 * | 3/2013 | Douglas | G10K 11/172 181/292 |
| 8,820,477 | B1 | 9/2014 | Herrera et al. | |
| 9,604,438 | B2 * | 3/2017 | Lumbab | B32B 37/12 |
| 9,640,164 | B2 * | 5/2017 | Gerken | G10K 11/002 |
| 9,693,166 | B2 * | 6/2017 | Herrera | H04R 31/00 |
| 2004/0226996 | A1 | 11/2004 | Stefani | |
| 2006/0038077 | A1 | 2/2006 | Olin et al. | |
| 2008/0075916 | A1 | 3/2008 | Bradford | |
| 2009/0045009 | A1 * | 2/2009 | Chiou | G10K 11/168 181/290 |
| 2011/0313563 | A1 | 12/2011 | Huber | |
| 2015/0315972 | A1 | 11/2015 | Lumbab et al. | |
| 2015/0373470 | A1 | 12/2015 | Herrera et al. | |
| 2016/0009067 | A1 | 1/2016 | Gerken et al. | |

OTHER PUBLICATIONS

HexWeb Acousti-Cap; http://www.hexcel.com/products/aerospace/aacousti-cap, Jun. 17, 2016.
U.S. Appl. No. 14/633,514.
WolframMathWorld; http://mathworld.wolfram.com/StampFolding.html, Jun. 17, 2016.
European Search Report; EP17173221; dated Nov. 16, 2017.
European Office Action; Application 17197832.3-1222; dated Jan. 25, 2019.
Kelly Fok et al; Optimizing Air Cargo load Planning and Analysis; Aug. 17, 2004.
Mongeau M et al; Optimization of Aircraft container Loading; Jan. 1, 2003.

* cited by examiner

ACOUSTIC PANELING

FIELD

The disclosure relates to the field of acoustic control, and in particular, to panels that provide acoustic control such as sound damping/attenuating as a function of frequency.

BACKGROUND

Aircraft engines produce a great deal of noise during takeoff, flight, and landing. In order to increase passenger comfort and provide a more pleasant experience during flight, acoustic paneling may be provided that dampens and/or redirects noise from the engines during takeoff, flight, and landing. Acoustic paneling within an aircraft may further be utilized to reduce/redirect aircraft noise away from bystanders that may be proximate to the aircraft during takeoff and landing.

Acoustic paneling may comprise a structure specifically designed to absorb or reflect sound away from a sensitive area. Ideally, acoustic paneling for an aircraft would be sufficient to completely absorb noise perceived by passengers from engines and other components. However, such an amount of acoustic paneling for an aircraft would be very heavy and/or occupy a substantial amount of space within the aircraft, which in turn increases the expense of transporting passengers. Furthermore, acoustic paneling is often painstakingly assembled cell by cell in order to conform to the complex geometries of an aircraft. Such labor intensive processes further increase the expense of manufacturing the aircraft, and are therefore undesirable. Hence, designers of aircraft carefully balance concerns of comfort and cost when adding acoustic paneling to an aircraft.

SUMMARY

Embodiments described herein provide techniques and automated manufacturing processes that transform sheets of thermoplastic material into multi-celled acoustic paneling for an aircraft. Specifically, embodiments provided herein fold, stamp, and/or extrude a planar sheet of thermoplastic material to form a multi-celled core of an acoustic panel. A facesheet with multiple openings is applied over the cells of the core in order to form the cells into acoustic chambers (e.g., for damping/attenuating one or more frequencies of sound). Using this fabrication technique, the speed of creating the acoustic panel may be beneficially increased, and costs may be reduced. The acoustic panels discussed herein provide a further benefit because they are capable of undergoing plastic deformation (e.g., via the application of heat and pressure) in order to conform to complex surfaces within an aircraft (e.g., an engine cowling).

One embodiment is an apparatus comprising an acoustic panel. The acoustic panel includes a core comprising multiple cells of thermoplastic having walls that are fused together. The panel also includes a facesheet fused to a surface of the core. The facesheet includes multiple openings through which sound waves enter the cells, resulting in acoustic control.

Another embodiment is a method for fabricating an acoustic panel. The method includes receiving a sheet of thermoplastic paper, conforming the sheet into rows that each comprise a three dimensional shape, and transforming the sheet into a multi-celled core. Transforming the sheet includes identifying fold lines separating the rows, folding the sheet at the fold lines in a pleat fold, thereby uniting upper surfaces of adjacent rows and uniting lower surfaces of adjacent rows; and compressing the rows of the folded sheet together in the presence of heat, causing adjacent rows to fuse together into cells. The method further includes applying a backing sheet to the core, and applying a facesheet to a surface of the core that includes openings which direct a portion of airflow across the facesheet into the cells, resulting in acoustic control.

A further embodiment is a method for performing acoustic control of jet engine noise via an acoustic panel. The method includes receiving airflow across openings of a facesheet of the panel that is fused to a multi-celled core of the panel, and directing the airflow into cells of the acoustic panel via the openings in the facesheet. The method also includes absorbing energy from the airflow as the airflow travels within the cells such that audible frequencies of sound generated by the airflow are attenuated by the cells, reflecting the airflow off of a backing sheet for the cells, and expelling the airflow from the cells via the facesheet.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
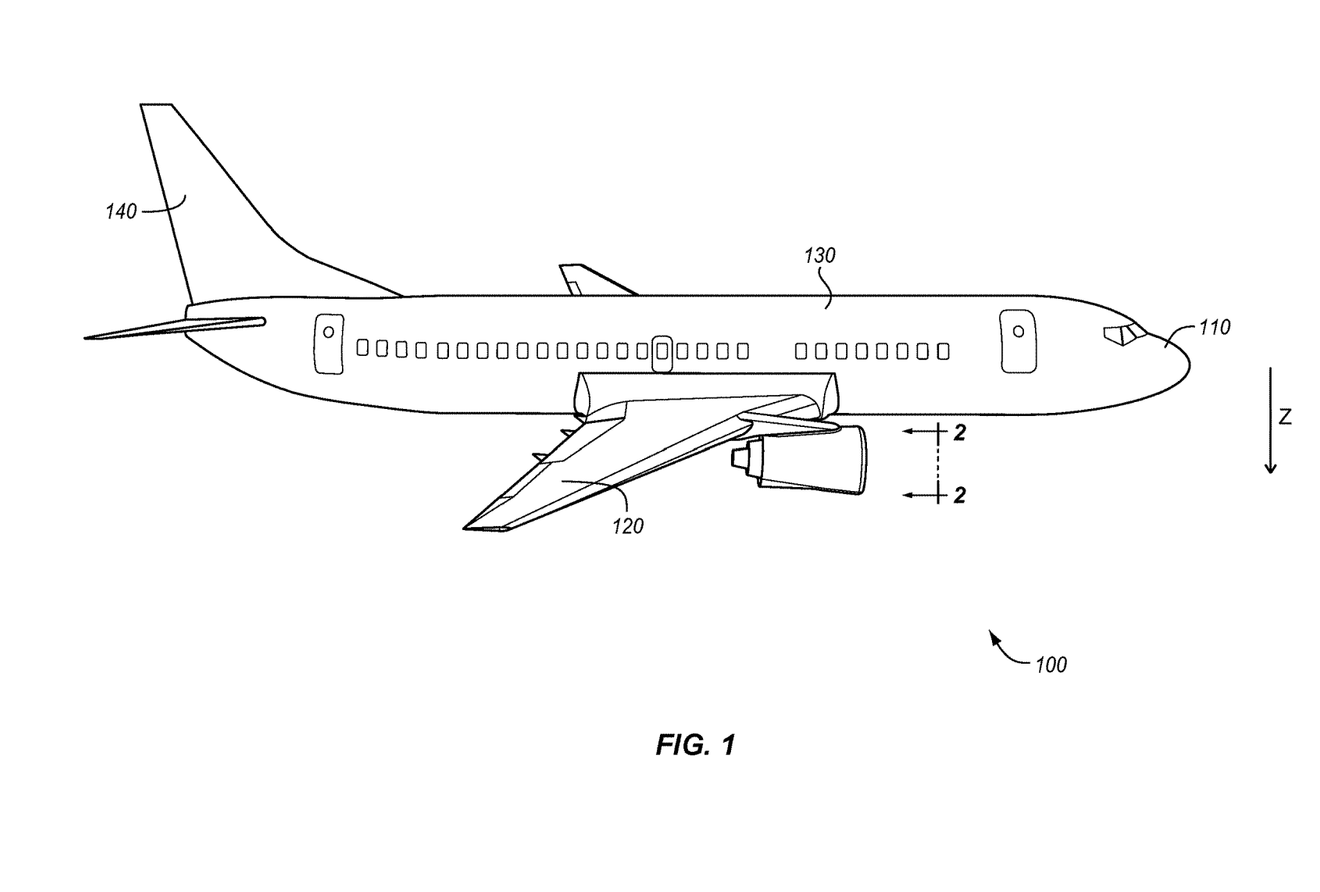
FIG. 1 is a diagram of an aircraft in an exemplary embodiment.
Figure 2:
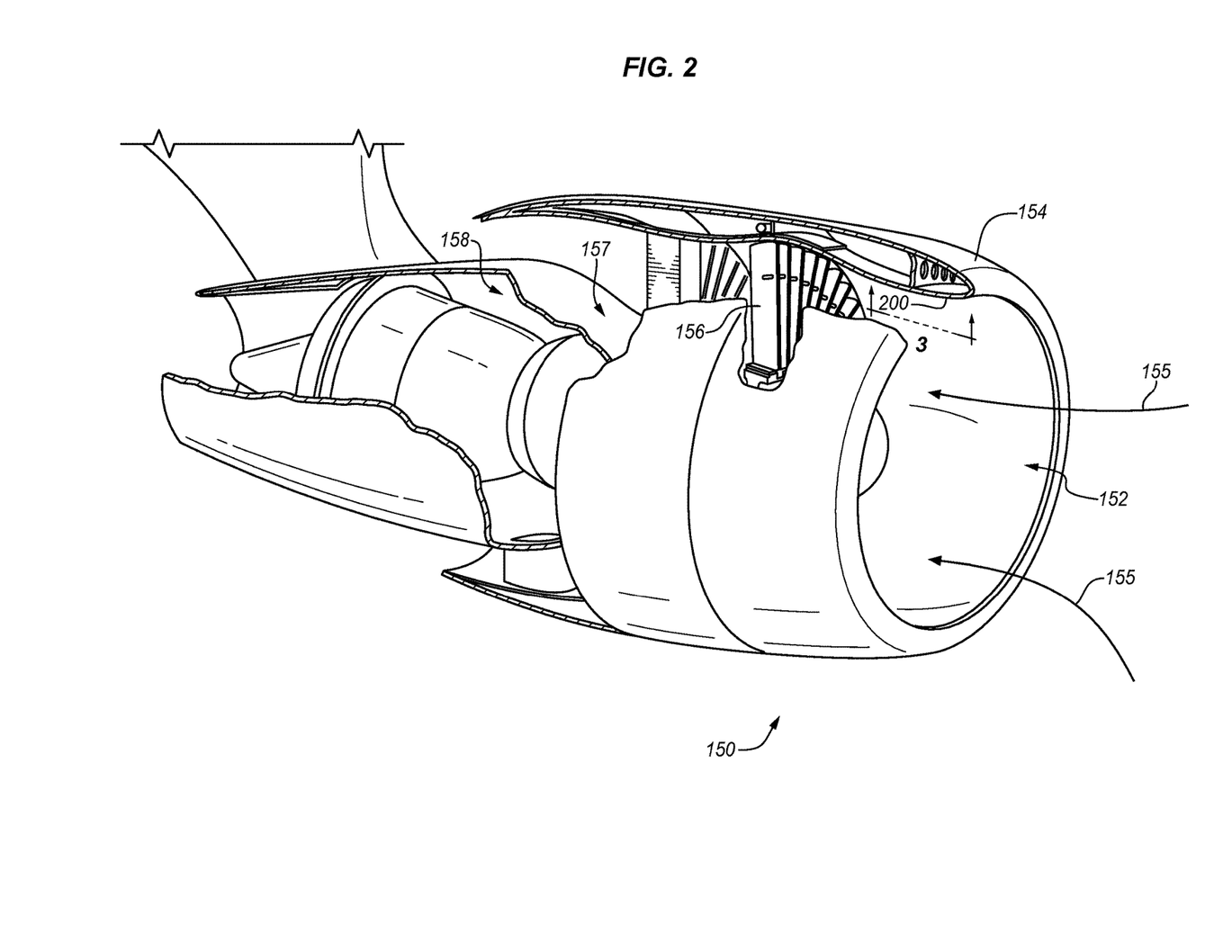
FIG. 2 is a diagram illustrating an engine of an aircraft in an exemplary embodiment.

FIGS. 1-2 illustrate environments that may benefit from enhanced acoustic control. Specifically, FIG. 1 is a diagram of an aircraft 100 in an exemplary embodiment. Aircraft 100 includes nose 110, wings 120, fuselage 130, tail 140, and engine 150 (e.g., a turbofan jet engine that generates noise perceptible to passengers). FIG. 1 also illustrates a downward direction (Z) for aircraft 100. FIG. 2 is a diagram of aircraft engine 150 indicated by view arrows 2 of FIG. 1. Engine 150 includes inlet 152 through which airflow 155 travels. Engine cowling 154 surrounds inlet 152, fan blades 156, compression section 157, and combustion section 158. As airflow 155 enters inlet 152 (e.g., during takeoff, flight, and landing), a substantial amount of noise is generated. This noise generated by inlet 152 may be audible to passengers inside of aircraft 100 at a level of volume that is undesirable. In order to control this noise, acoustic panel 200 is placed within inlet 152 such that sound waves within inlet 152 will be subject to control/damping/attenuation by acoustic panel 200. This beneficially increases passenger comfort.

Figure 3:
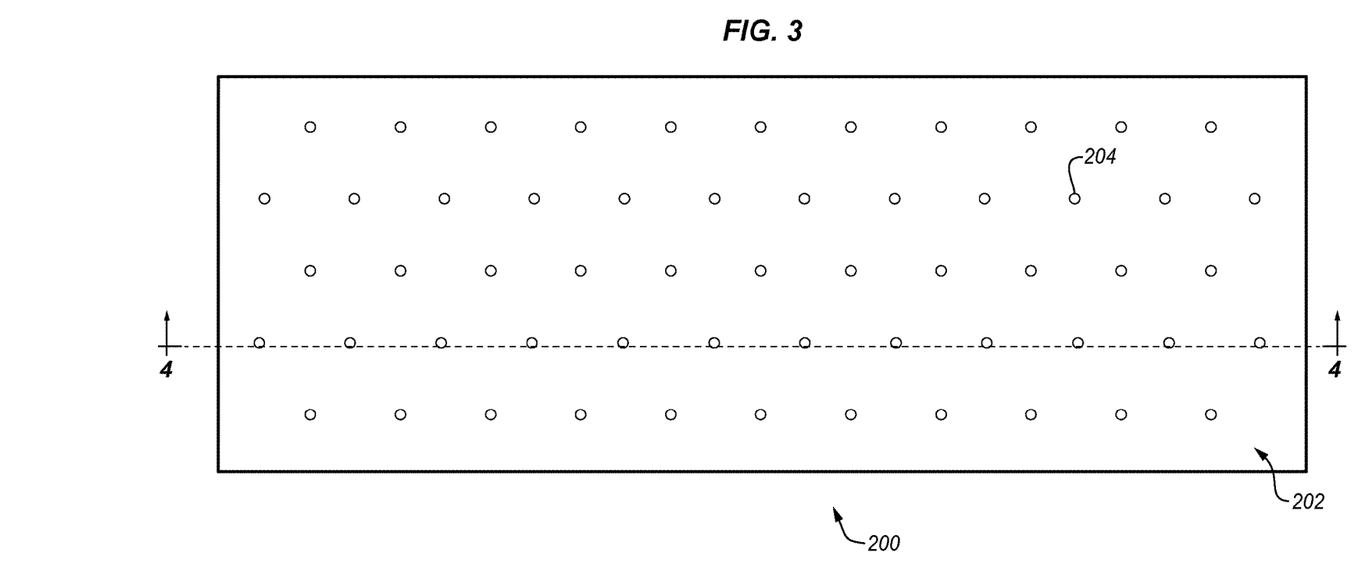
FIGS. 3-9 are diagrams illustrating a multi-celled acoustic panel in an exemplary embodiment.
Figure 4:
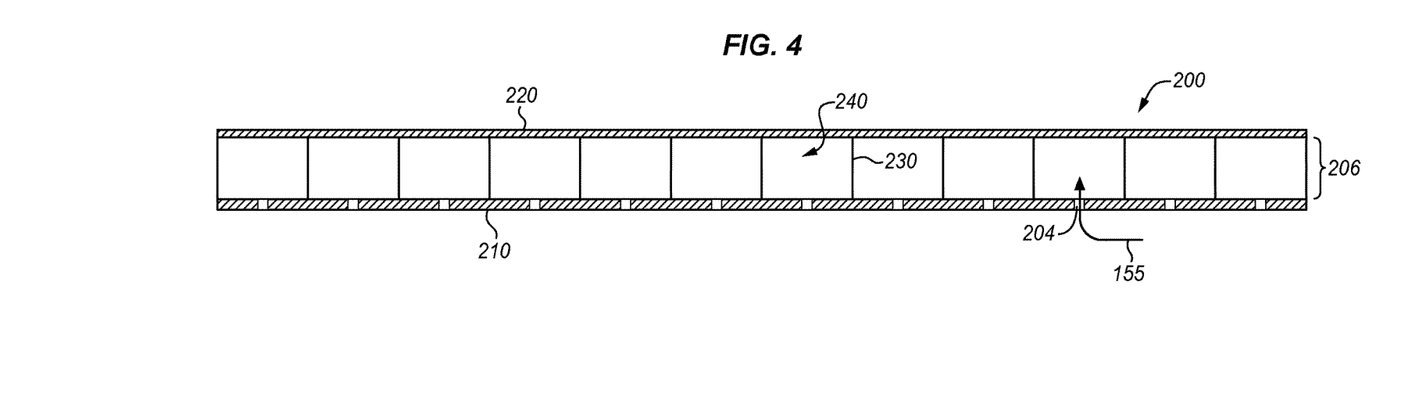

Further details of the features of acoustic panel 200 are described with regard to FIGS. 3-9. Specifically, FIGS. 3-4 illustrate a fully fabricated acoustic panel 200, while FIGS. 5-9 illustrate a fabrication process for creating a hexagonal "honeycomb" core of cells for panel 200. FIG. 3 is an underside view of panel 200 that illustrates a view of a face 202 of panel 200 indicated by view arrows 3 of FIG. 2. As shown in FIG. 3, the underside of acoustic panel 200 includes openings 204 through which airflow may enter and/or exit panel 200 for acoustic control. FIG. 4 illustrates a section cut view of a side of acoustic panel 200 illustrated by view arrows 4 of FIG. 3. FIG. 4 illustrates that panel 200 includes a core 206 which includes cells 240 defined by borders/walls 230. Each cell 240 in panel 200 is sandwiched between (i.e., encapsulated by) a facesheet 210 and a backing sheet 220. Facesheet 210 is exposed to airflow 155 across panel 200. Furthermore, as shown in FIG. 4, openings 204 allow sound waves/vibrations from airflow 155 to enter cells 240. These sound waves from airflow 155 may then be attenuated by travel within cells 240 and/or reflection off of backing sheet 220 (as will be illustrated in later FIGS. Further discussion of acoustic panel 200 in FIGS. 5-9 focuses upon the fabrication of acoustic panel 200. The fabrication techniques discussed herein beneficially forego traditional techniques of manually creating each cell of an acoustic panel.

Figure 5:
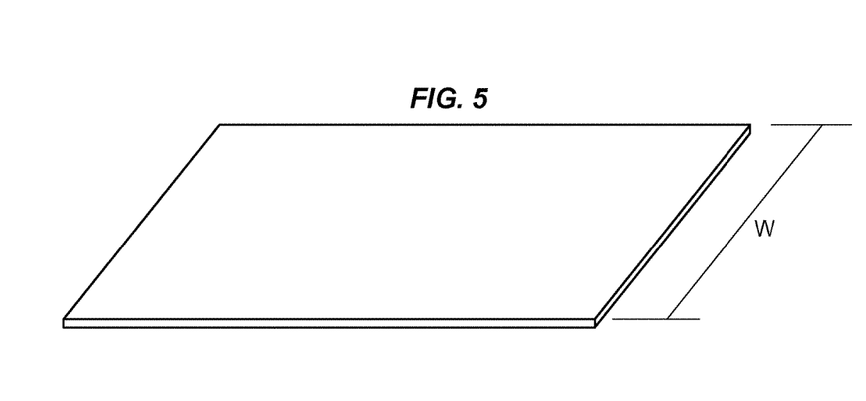
Figure 6:
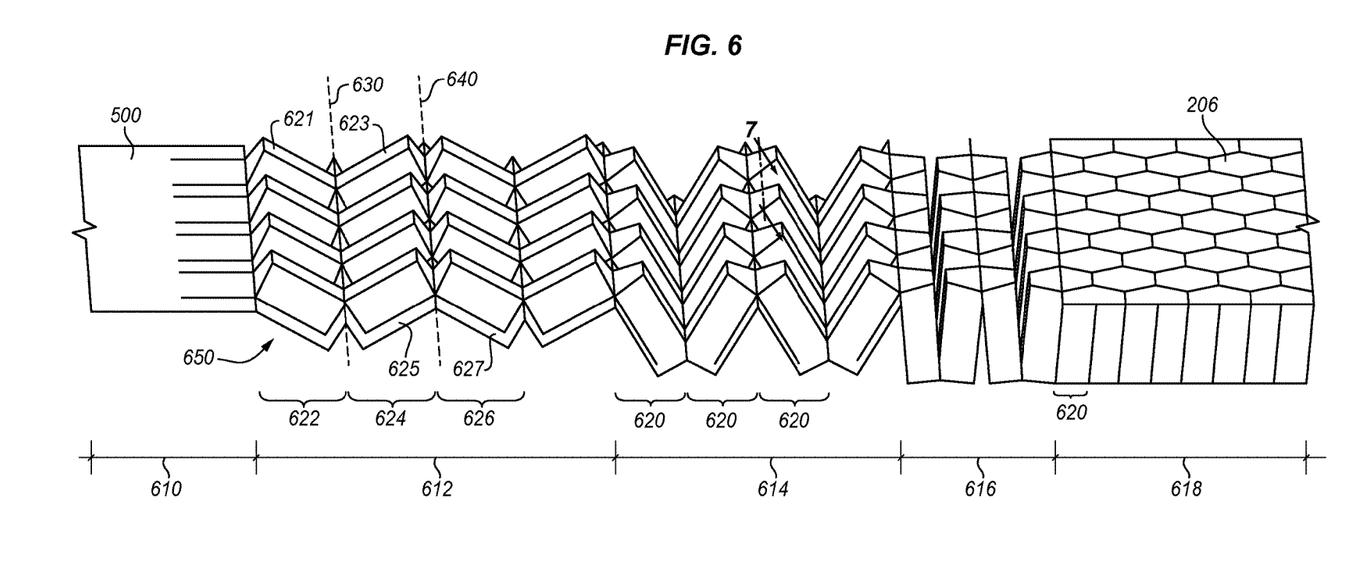

FIG. 5 illustrates that in order to form core 206 of cells 240, a sheet 500 of thermoplastic paper (e.g., Poly Ether Ether Ketone (PEEK)) may first be acquired. Sheet 500 is stamped and folded by machinery into individual rows 620 (e.g., row 622, row 624, row 626, etc.). As shown in FIG. 6, after stamping/conforming has been completed, each row 620 defines a three dimensional (3D) shape 650, which in this case is a series of half-hexagons shown in FIG. 7. Individual rows are mirrored with respect to their neighboring/adjacent rows. For example, row 624 is mirrored with respect to row 622 along fold line 630, and row 624 is further mirrored with respect to row 626 along fold line 640. When rows 622, 624, and 626 are folded together, upper surface 621 of row 622 is mated against upper surface 623 of row 624. Furthermore, lower surface 625 of row 624 is mated with lower surface 627 of row 626. When rows 620 are pressed against their neighbors via the application of sufficient heat and/or pressure, the mated surfaces (e.g., 621 and 623, 625 and 627) of these rows fuse together to form an integral, single seamless piece of thermoplastic. The process of stamping and/or folding sheet 500 into core 206 is shown to progress over time from left to right as indicated by regions 610, 612, 614, 616, and 618 of FIG. 6. Thus, core 206 may be formed from a single sheet 500 of thermoplastic.

Figure 7:
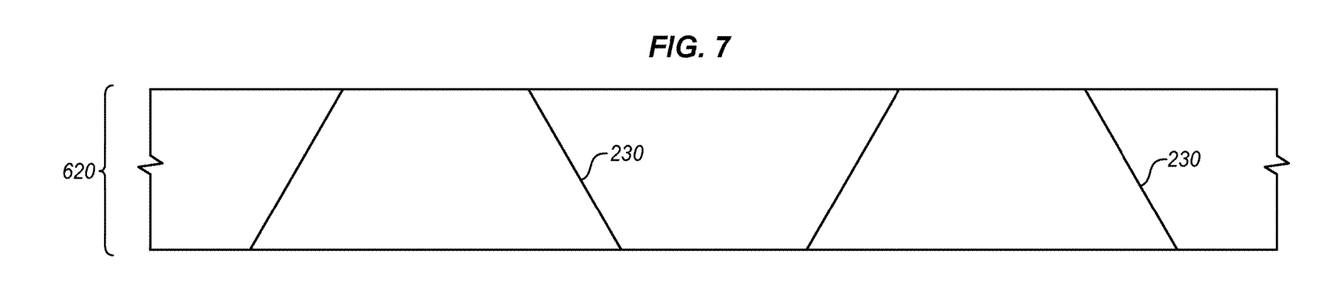
Figure 8:
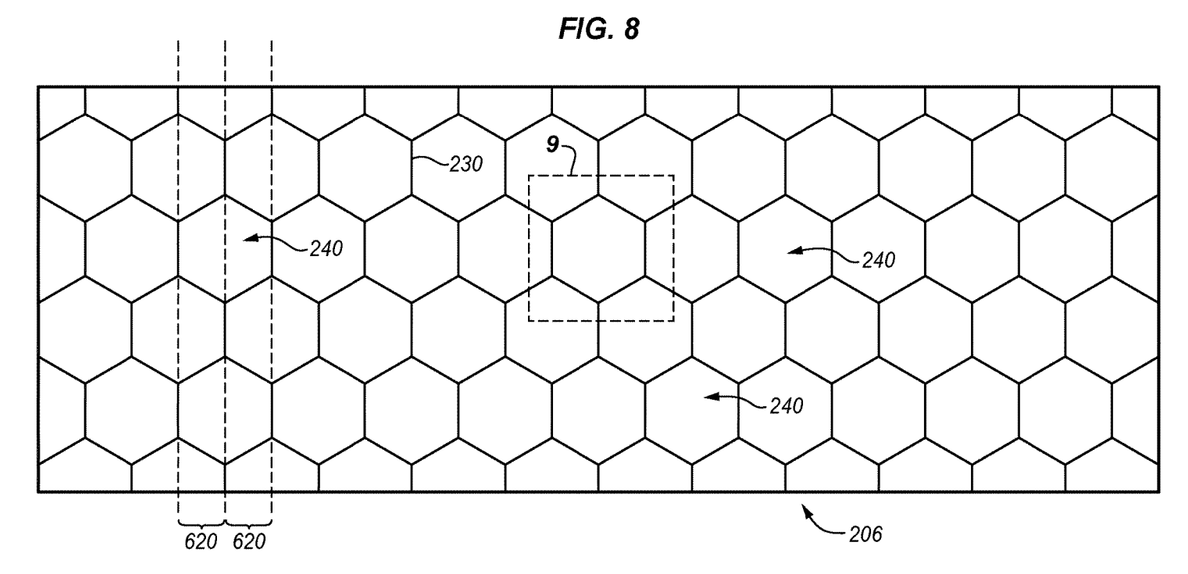

FIG. 7 illustrates a view of an individual row 620. Specifically, the view of FIG. 7 is indicated by view arrows 7 of FIG. 6. As shown in FIG. 7, the three dimensional shape 650 defining each row 620 may include a series of walls 230 that form trapezoids, half hexagons, or any suitable shape (e.g., half-circles, "C" patterns, etc.). In this manner, when rows 620 are folded together, walls 230 may unite to form hexagonal cells 240 shown in FIG. 8. FIG. 8 further illustrates that each row 620 may form half of a hexagonal cell 240.

Figure 9:
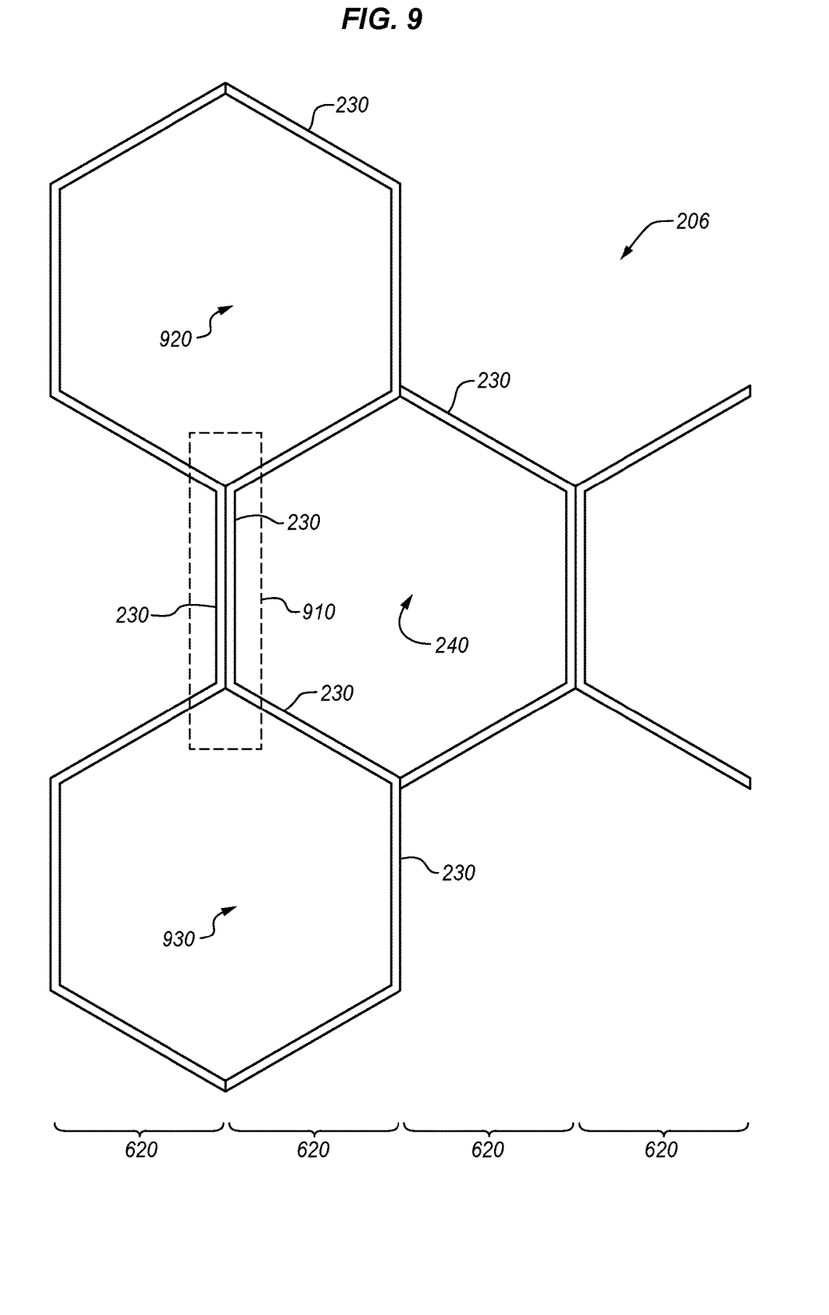

FIG. 9 illustrates a zoomed in view of a cell 240 corresponding to region 9 of FIG. 8. FIG. 9 makes clear that in the folded and stamped configuration, each hexagonal cell 240 may include multiple walls 230 defining a single side, as shown in region 910. This could potentially present a problem by enabling sound waves to travel between cells 920 and 930, which is undesirable because it inhibits the ability of these cells to perform acoustic control of specific frequencies of sound. This problem may be addressed by heating core 206 and pressing walls 230 together in region 910 (e.g., as part of the fold-stamping process), resulting in walls 230 plastically deforming and integrating into each other to create core 206 as a singly integral shape comprising unified, seamless walls 230 of thermoplastic material.

The techniques shown in FIGS. 5-9 are vastly beneficial, because they enable the automated creation of vast quantities of cells for acoustic panels. This substantially reduces labor costs involved in producing acoustic panels.

Figure 10:
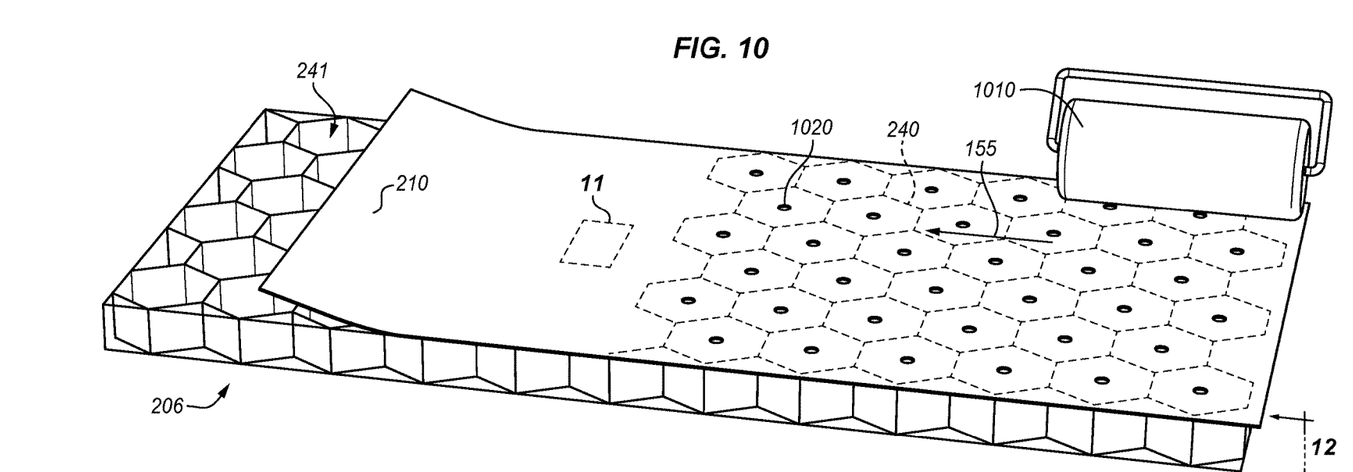
FIGS. 10-12 are diagrams illustrating a facesheet of an acoustic panel in an exemplary embodiment.
Figure 11:
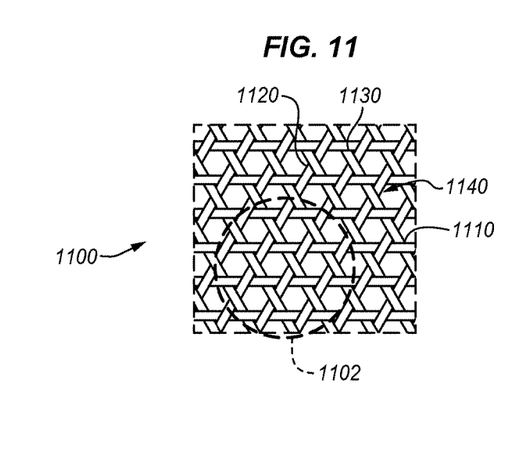
Figure 12:
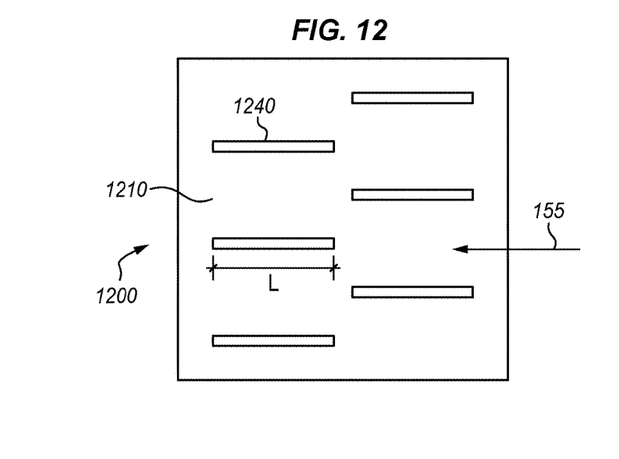

FIGS. 10-12 are diagrams illustrating application of a facesheet onto core 206 in order to form an acoustic panel in an exemplary embodiment. As shown in FIG. 10, facesheet 210 is disposed onto core 206, at surface 241 defined by cells 240. Facesheet 210 includes perforations 1020 and/or open interstices over each cell 240 in order to enable sound waves to enter cells 240 as airflow 155 rushes across panel 200. Facesheet 210 may be applied, for example, via a roller 1010. In embodiments where facesheet 210 comprises a thermoplastic, facesheet 210 may be structurally united/fused with cells 240 via the application of heat and pressure at roller 1010, causing facesheet 210 and cells 240 to form a single integral seamless whole of the same thermoplastic material. Facesheet 210 performs a substantially beneficial role for acoustic panel 200, because facesheet 210 defines a resistance of each cell 240 to receiving (and/or releasing) a sound wave. By calibrating this property of facesheet 210 to ensure that some, but not all airflow 155 may enter a cell 240, acoustic control (e.g., sound dampening) may be beneficially achieved by panel 200.

FIG. 11 illustrates an embodiment where facesheet 210 comprises a woven linear layer 1100. Layer 1100 includes an open weave 1102 of material formed from linear segments (1110, 1120, 1130) of thermoplastic. In this embodiment, the open weave 1102 may comprise any suitable weave that leaves open interstices 1140 between the linear segments (1110, 1120, 1130). The weave may further comprise a square weave, hexagonal weave, etc. Furthermore, the weave may be quantified by a "Percent Open Area" (POA) indicating a percentage of total area of the weave that is occupied by open interstices (i.e., instead of linear segments). It may be desirable to ensure that the POA and interstice sizes are selected such that each cell 240 receives sound energy directly via at least one interstice 1140. In further embodiments, weave 1102 may define multiple types of interstices 1140 of different sizes and/or shapes.

In still further embodiments such as shown in FIG. 12, facesheet 210 may comprise a layer of thermoplastic 1210 (e.g., of about 1 millimeter in thickness), which includes multiple perforations, openings, and/or slots 1240. Slots 1240 are elongated in an expected direction of airflow 155. That is, the longest dimension of slots 1240 (L) is measured in the direction of expected airflow 155, and airflow 155 enters cells 240 via slots 1240.

Figure 13:
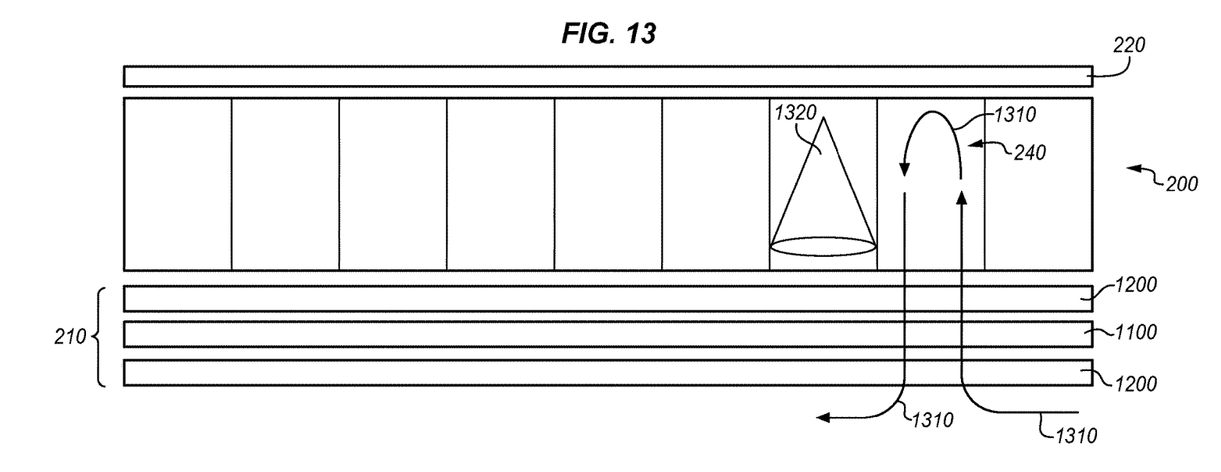
FIGS. 13-14 are cross-sections illustrating components of an acoustic panel in an exemplary embodiment.
Figure 14:
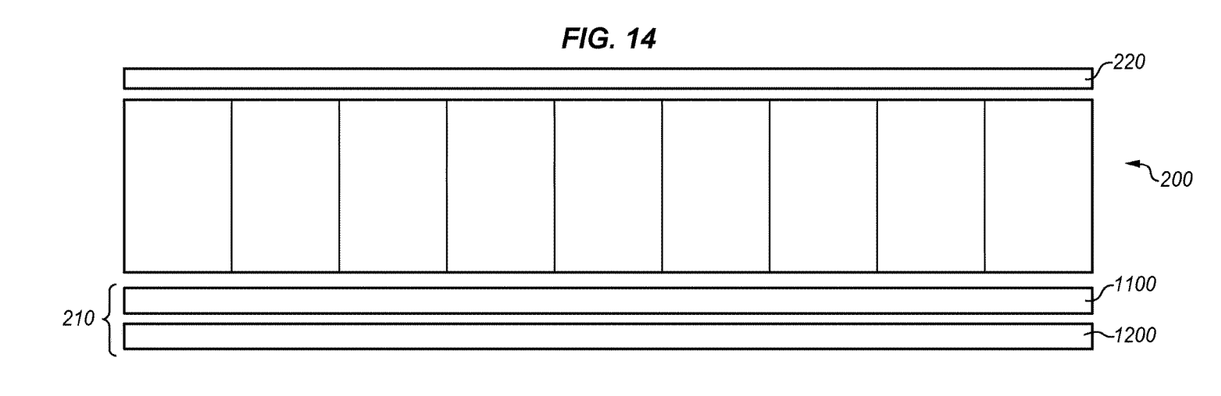

FIGS. 13-14 are cross-sections illustrating components of an acoustic panel 200 in an exemplary embodiment. In the embodiment shown in FIG. 13, facesheet 210 includes two perforated thermoplastic sheets 1200, and woven linear layer 1100. One of sheets 1200 is in contact with surface 241 of cells 240, and layer 1100 is in contact with both sheets 1200 (i.e., because it is sandwiched between both sheets). Airflow 1310 causes soundwaves to enter cell 240, reflect off of backing sheet 220. In some embodiments, a septum 1320 of sound absorbing material (e.g., flexible foam) is included within each cell 240, to further facilitate the damping/attenuation and/or control of sound. In such embodiments, airflow 1310 is directed through septum 1320 prior to reflecting off of backing sheet 220. FIG. 14 illustrates a further variation of an acoustic panel 200. In FIG. 14, facesheet 210 comprises a linear woven layer 1100 in contact with cells 240, and a perforated thermoplastic sheet 1200 forming a layer in contact with layer 1100.

The arrangement of materials and structure described above enables a designer to programmatically design acoustic panels 200 in a manner that specifically absorbs sound at desired frequencies. By way of analogy, each cell 240 in panel 200 may be equated to a circuit that includes a resistor, inductor, and capacitor (an RLC circuit). In such an embodiment, sound level may be equated to voltage, mass flow of air into a cell 240 may be equated to amperage, and so on. The amount of sound attenuated for specific frequencies (e.g., the frequency response of the RLC circuit) may be controlled by adjusting various physical parameters pertaining to the cell 240.

Figure 15:
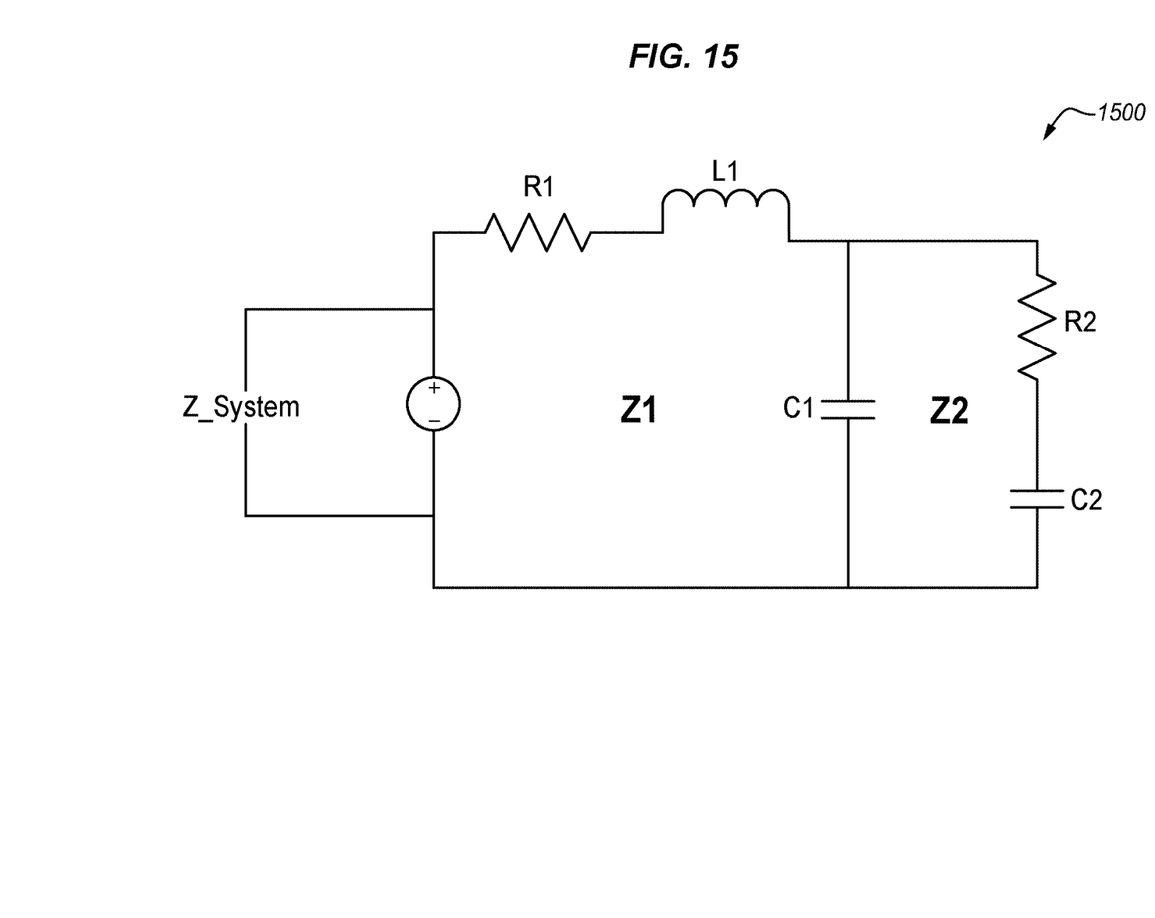
FIG. 15 is a circuit diagram illustrating acoustic control in an exemplary embodiment.

Utilizing the circuit diagram 1500 of FIG. 15, an impedance of an entire acoustic panel can be calibrated. In such an embodiment, R1 and R2 represent resistors of the RLC circuit of FIG. 15, C1 and C2 represent capacitors of the RLC circuit of FIG. 15, and L1 represents an inductor of the RLC circuit. From these features, Z1, Z2, and Z_system (representing impedance of various portions of the circuit) may be calculated. Specifically, R1 corresponds to a resistance/damping of acoustic energy provided by a facesheet of the panel. L1 corresponds to impedance of air flow caused by the shape, number, and/or size of openings in the facesheet (and may, for example, be calibrated by adjusting POA for the facesheet). Continuing onward, C1 corresponds to a volume of air between a septum and the facesheet, while C2 corresponds to a volume of air between the septum and a backing sheet. R2 is defined by resistance/damping of acoustic energy caused by travel through the septum. Z1 may be calibrated by varying R1, L1, and C1 as desired. In a similar fashion, Z2 may be calibrated based on values for R2 and C2. In this manner, Z_system for the entirety of the acoustic panel may rapidly be calculated. For example, the POA of facesheet 210 may be chosen to provide a specific level of resistance to airflow into cell 240 that dampens a selected frequency of audible sound. Meanwhile, the thickness of facesheet 210 may provide an inductive response that regulates mass flow of air into cell 240. A septum 1320 within cell 240 may define capacitance (energy storage) of the cell, and further may resist airflow. Thus, volumes of free space within cell 240, as well as the total volume of cell 240 may be considered and programmatically controlled in a double Degree of Freedom (DOF) system in order to control the acoustic properties of cell 240 in order to control/dampen specific frequencies. This technique may be particularly helpful in scenarios where specific frequencies of noise from engine 150 are perceptible to passengers of aircraft 100 and known to cause discomfort to passengers of aircraft 100.

The structural design described above provides a further benefit in embodiments where facesheet 210 and cells 240 are both formed from thermoplastic. In such embodiments, since acoustic panels 200 are composed of thermoplastic (e.g., are entirely composed of thermoplastic), they may be heated and/or pressed in order to facilitate their shaping/contouring to any desired geometry within aircraft 100. This may be performed while preserving the integrity of facesheet 210, because facesheet 210 is capable of plastically deforming to conform to a desired surface geometry of aircraft 100. In such embodiments, conforming acoustic panel 200 to a complex geometry may be performed without damaging acoustic panel 200 or otherwise decreasing its effectiveness. These properties of acoustic panel 200 also substantially increase the ease of installing acoustic panel 200.

Illustrative details of the fabrication and operation of acoustic panel 200 will be discussed with regard to FIGS. 16 and 17. Specifically, FIG. 16 describes fabrication of acoustic panel 200, while FIG. 17 describes operation of acoustic panel 200. Assume, for this embodiment, that a thermoplastic sheet 500 has been received for forming into acoustic panel 200.

Figure 16:
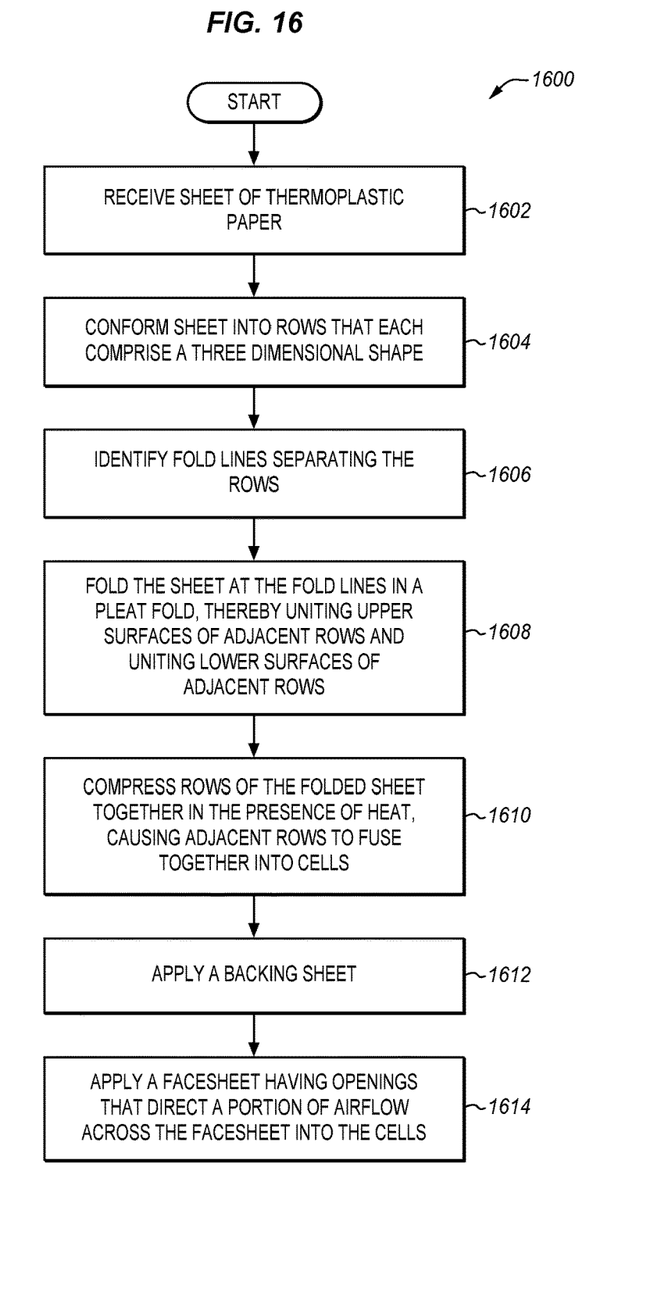
FIG. 16 is a flowchart illustrating a method for fabricating an acoustic panel in an exemplary embodiment.

FIG. 16 is a flowchart illustrating a method 1600 for fabricating an acoustic panel in an exemplary embodiment. The steps of method 1600 are described with reference to aircraft 100 and panel 200 of FIGS. 1-2, but those skilled in the art will appreciate that method 1600 may be performed in other systems. The steps of the flowcharts described herein are not all inclusive and may include other steps not shown. The steps described herein may also be performed in an alternative order.

According to FIG. 16, sheet 500 of thermoplastic is received and is subdivided into rows 620 (step 1602). In one embodiment, each row comprises an equal portion of sheet 500, spanning across a width (FIG. 5, W) of sheet 500. Sheet 500 is then conformed/stamped into rows 620, such that each row 620 comprises a three dimensional shape 650 (step 1604). For example, after stamping, adjacent rows 620 may be mirrored versions of the three dimensional shape. Next, sheet 500 is transformed/shaped into multi-celled core 206 by identifying fold lines (e.g., 630, 640) separating rows 620 (step 1606), and folding sheet 500 at the fold lines in a pleat fold (also known as an "accordion fold), which cause upper surfaces of adjacent rows to unit and also causes lower surfaces of adjacent rows to unite (step 1608). Specifically as shown in FIG. 6, for row 624, sheet 500 may be folded along fold lines (630, 640) with respect to adjacent rows (622, 626). This mates upper surface 621 of row 622 against upper surface 623 of row 624, and further mates lower surface 625 of row 624 with lower surface 627 of row 626. The rows of the folded sheet 500 are also compressed together in the presence of heat, causing adjacent rows to fuse together into cells 240 (step 1610). This combines mated surfaces of sheet 500 together to integrate them into a unified, seamless single core 206.

After core 206 of cells 240 has been formed by folding-stamping rows 620 in the manner described above, backing sheet 220 is applied to core 206 (step 1612), as is facesheet 210 (step 1614). Facesheet 210 may then be fabricated to exhibit a desired POA, based on the cell size for core 206. For example, facesheet 210 may be punched with holes/slots in a predefined pattern corresponding to the cells of core 206. Facesheet 210 includes openings that are aligned to direct a portion of airflow 155 across facesheet 210 into cells 240, resulting in acoustic control. Furthermore, facesheet 210 may be fused to core 206 to combine both of these elements into one integral piece of fused material. This completes acoustic panel 200.

Figure 17:
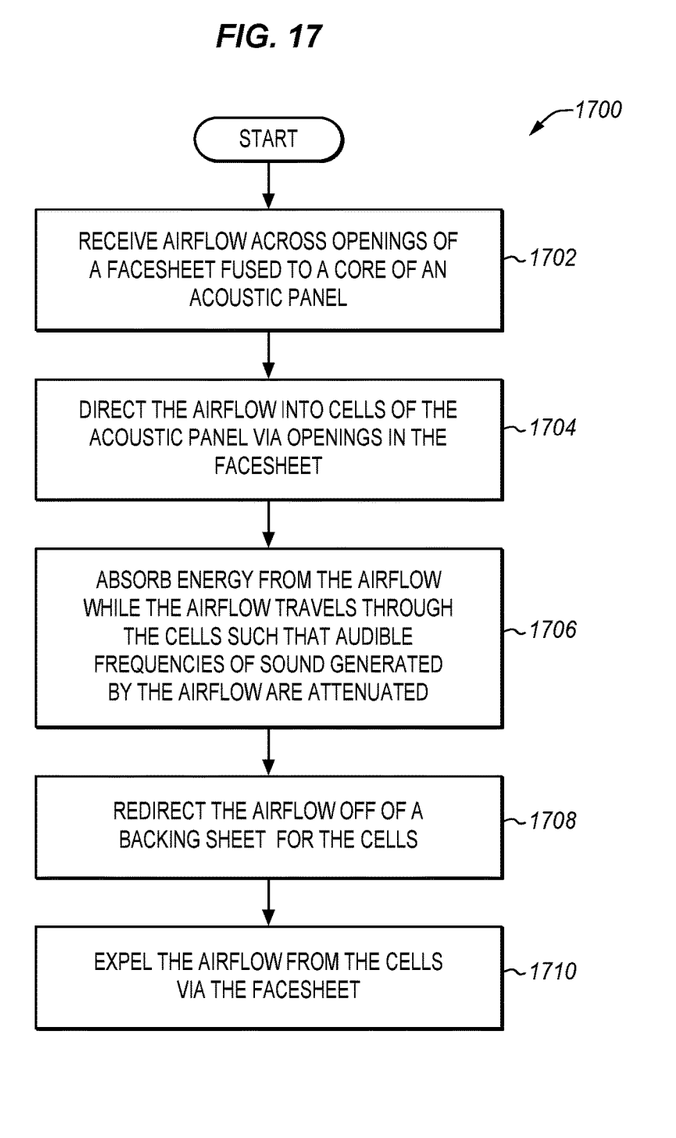
FIG. 17 is a flowchart illustrating a method for utilizing an acoustic panel in an exemplary embodiment.

FIG. 17 is a flowchart illustrating a method 1700 for utilizing an acoustic panel 200 in an exemplary embodiment. Assume, for this embodiment, that acoustic panel 200 has been installed on aircraft 100 (e.g., at engine 150) for the purpose of damping/attenuating noise generated by inlet 152. As airflow 155 travels along inlet 152, facesheet 210 receives airflow 155 (step 1702). Facesheet 210 is integral with (i.e., combined/fused with to form a single integral whole) and made from the same thermoplastic material as cells 240. Facesheet 210 directs soundwaves from airflow 155 into a cell 240 of acoustic panel 200, via openings 204 in facesheet 210 (e.g., perforations 1020, interstices 1140, and/or slots 1240) (step 1704). Cell 240 absorbs energy from the sound waves as the sound waves travel through cell 240, such that audible frequencies (e.g., 20 Hz to 20 kHz) of sound generated by airflow 155 are attenuated (step 1706). Furthermore, airflow 155 is redirected off of backing sheet 220 of cell 240 (step 1708), and expelled outward from cell 240 via facesheet 210 (step 1710). These steps of directing, absorbing, reflecting, and expelling airflow for cells occurs as a continuous process (e.g., multiple times) as airflow continues across cells 240.

Using methods 1600-1700, acoustic paneling may be fabricated quickly and efficiently, and may be utilized by an aircraft to increase passenger comfort. Furthermore, the acoustic panels discussed herein, because they are thermoplastic, are capable of being fabricated substantially planar, heated and/or pressed, and then shaped/formed to conform with complex geometries of the aircraft. This enhances both the ease of manufacturing panel 200, and the ease of installing panel 200.

Examples

In the following examples, additional processes, systems, and methods are described in the context of acoustic panels used for acoustic control (e.g., damping/attenuating, or enhancing, a sound).

Figure 18:
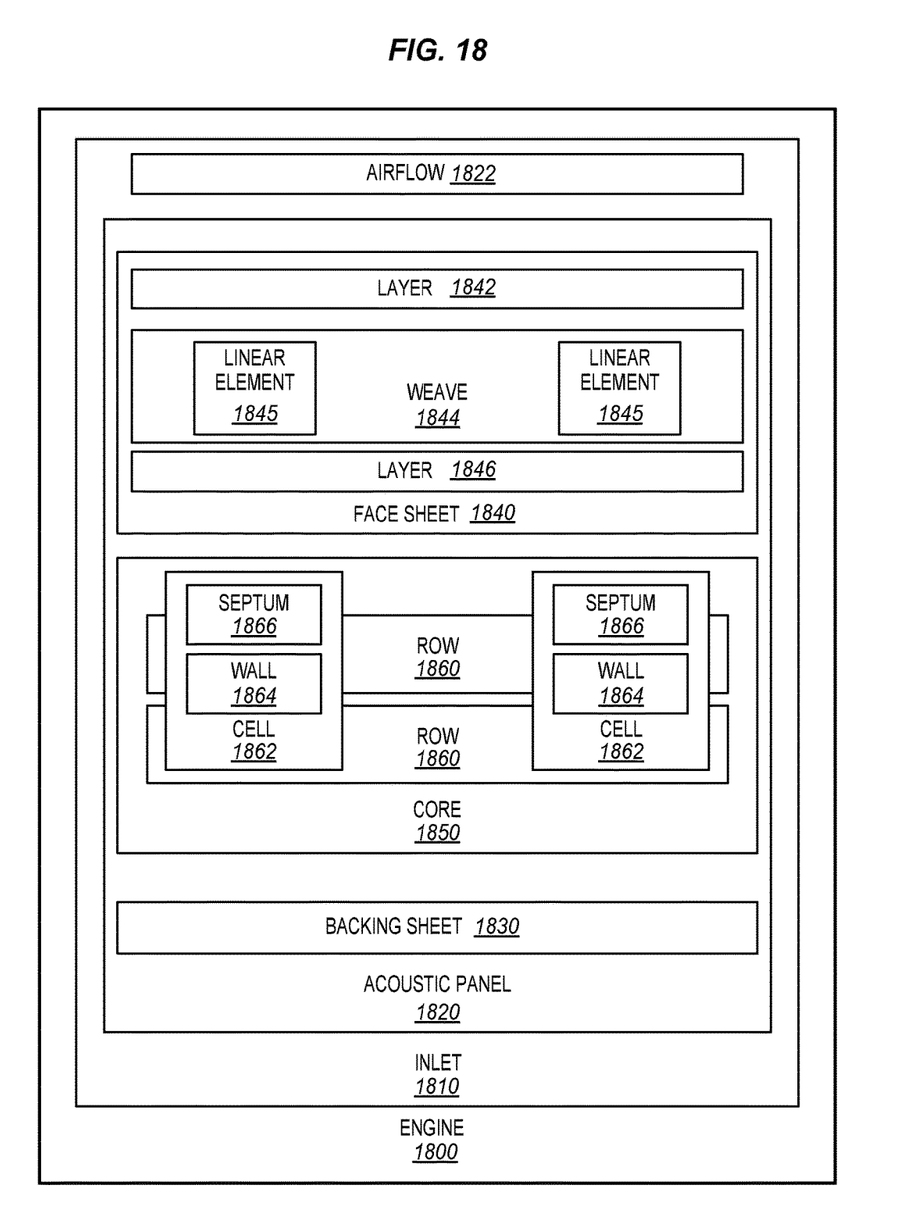
FIG. 18 is a block diagram of an engine utilizing an acoustic panel in an exemplary embodiment.

FIG. 18 is a block diagram of an engine 1800 utilizing an acoustic panel 1820 in an exemplary embodiment. As shown in FIG. 18, acoustic panel 1820 is located within inlet 1810. Panel 1820 includes backing sheet 1830, and core 1850, which has been folded and heated to form rows 1860 which define cells 1862. Each cell 1862 is surrounded by walls 1864, and includes a sound damping/attenuating septum 1866. Furthermore, each cell 1862 is covered by facesheet 1840, which include layers of thermoplastic 1842 and 1846, as well as a weave 1844 of linear elements 1845. Airflow 1822 travels across facesheet 1840, and soundwaves from airflow 1822 are dampened/attenuated by cells 1862.

Figure 19:
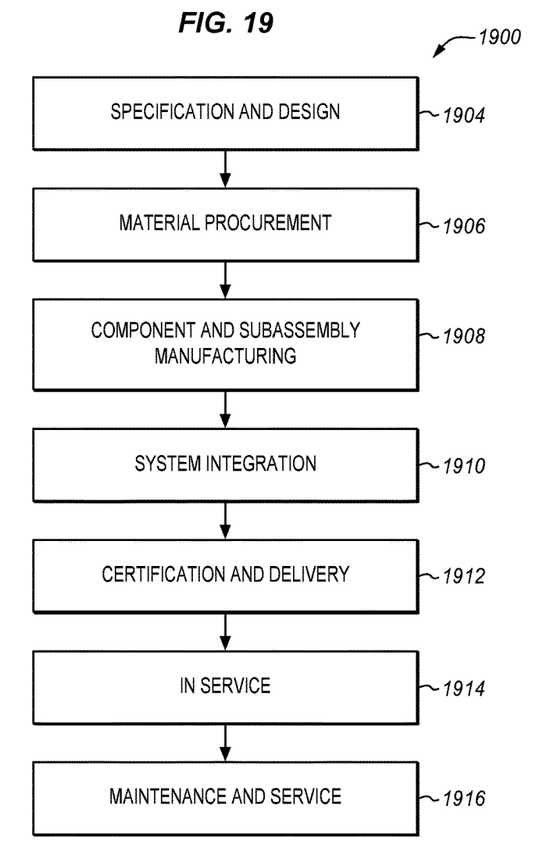
FIG. 19 is a flow diagram of aircraft production and service methodology in an exemplary embodiment.
Figure 20:
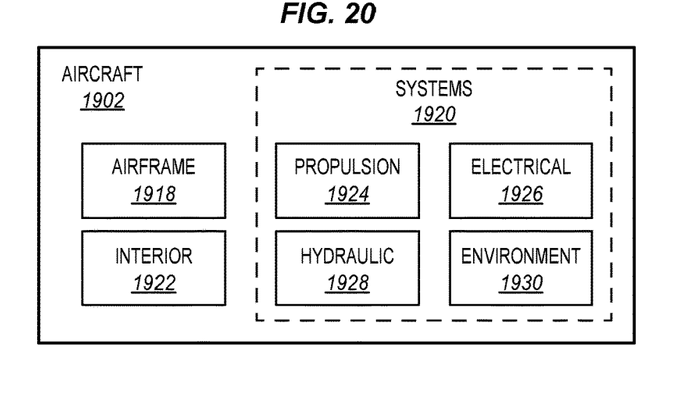
FIG. 20 is a block diagram of an aircraft in an exemplary embodiment.

Referring more particularly to the drawings, embodiments of the disclosure may be described in the context of an aircraft manufacturing and service method 1900 as shown in FIG. 19 and an aircraft 1902 as shown in FIG. 20. During pre-production, exemplary method 1900 may include specification and design 1904 of the aircraft 1902 and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine maintenance and service 1916 (which may also include modification, reconfiguration, refurbishment, and so on). Apparatus and methods embodied herein may be employed during any one or more suitable stages of the production and service method 1900 (e.g., specification and design 1904, material procurement 1906, component and subassembly manufacturing 1908, system integration 1910, certification and delivery 1912, service 1914, maintenance and service 1916) and/or any suitable component of aircraft 1902 (e.g., airframe 1918, systems 1920, interior 1922, propulsion 1924, electrical 1926, hydraulic 1928, environmental 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 1902 produced by exemplary method 1900 may include an airframe 1918 with a plurality of systems 1920 and an interior 1922. Examples of high-level systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1900. For example, components or subassemblies corresponding to production stage 1908 may be fabricated or manufactured in a manner similar to components or subassemblies produced while the aircraft 1902 is in service. Also, one or more apparatus embodiments, method embodiments, or a combination thereof may be utilized during the production stages 1908 and 1910, for example, by substantially expediting assembly of or reducing the cost of an aircraft 1902. Similarly, one or more of apparatus embodiments, method embodiments, or a combination thereof may be utilized while the aircraft 1902 is in service, for example and without limitation, to maintenance and service 1916. For example, the techniques and systems described herein may be used for steps 1906, 1908, 1910, 1914, and/or 1916, and/or may be used for airframe 1918 and/or interior 1922. These techniques and systems may even be utilized for systems 1920, including for example propulsion 1924, electrical 1926, hydraulic 1928, and/or environmental 1930.

In one embodiment, panel 200 comprises a portion of airframe 1918, and is manufactured during component and subassembly manufacturing 1908. Panel 200 may then be assembled into an aircraft in system integration 1910, and may for example be heated in order to facilitate its insertion and contouring into a portion of airframe 1918. Panel 200 may then be utilized in service 1914 to reduce noise until wear renders panel 200 unusable. Then, in maintenance and service 1916, panel 200 may be discarded and replaced with a newly manufactured panel.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
   an acoustic panel comprising:
   a core comprising a singly integral shape of unified, seamless walls of thermoplastic material that are fused together to define multiple cells that form open acoustic chambers along their length;
   a backing sheet that seals off a first opening of each of the open chambers; and
   a facesheet of the thermoplastic material that is fused together with a surface of the core disposed at a second opening of each of the open acoustic chambers to form a single integral seamless whole of the thermoplastic material, the facesheet including multiple openings through which sound waves enter the cells, resulting in acoustic control.

2. The apparatus of claim 1 wherein:
the core comprises a single sheet of Poly Ether Ether Ketone (PEEK) thermoplastic paper.

3. The apparatus of claim 2 wherein:
the facesheet comprises a single sheet of Poly Ether Ether Ketone (PEEK) thermoplastic paper that has been fused together with the surface of the core to form the single integral seamless whole.

4. The apparatus of claim 1 wherein:
the facesheet includes multiple slots that are each elongated in an expected direction of airflow across the facesheet and the slots of the facesheet are aligned such that airflow may enter each cell of the acoustic panel via at least one of the slots.

5. The apparatus of claim 1 wherein:
the acoustic panel is installed into a jet engine inlet and is oriented such that flow through the inlet contacts the facesheet.

6. The apparatus of claim 1 wherein:
the facesheet comprises an open weave of linear elements, wherein the open weave includes an interstice at each of the cells.

7. The apparatus of claim 6 wherein:
the open weave exhibits a Percentage Open Area (POA), calculated by comparing area filled by openings to a total area of the face sheet, that corresponds with attenuation of an audible frequency of sound.

8. The apparatus of claim 1 wherein:
the facesheet comprises a layer of thermoplastic in contact with the surface, a layer of open weave in contact with the layer of thermoplastic, and an additional layer of thermoplastic in contact with the open weave.

9. The apparatus of claim 1 wherein:
the facesheet comprises a layer of open weave in contact with the surface, and an additional layer of thermoplastic in contact with the open weave.

10. The apparatus of claim 1 further comprising:
an acoustically controlling septa inserted into each of the cells.

* * * * *